(12) United States Patent　　(10) Patent No.: US 7,405,801 B2
Jacobs　　(45) Date of Patent: *Jul. 29, 2008

(54) SYSTEM AND METHOD FOR PULFRICH FILTER SPECTACLES

(76) Inventor: Kenneth Jacobs, 94 Chambers St., New York, NY (US) 10007

( * ) Notice: Subject to any disclaimer, the term of this patent is extended or adjusted under 35 U.S.C. 154(b) by 187 days.

This patent is subject to a terminal disclaimer.

(21) Appl. No.: 11/373,702

(22) Filed: Mar. 10, 2006

(65) Prior Publication Data

US 2006/0256287 A1　Nov. 16, 2006

Related U.S. Application Data

(63) Continuation-in-part of application No. 10/054,607, filed on Jan. 22, 2002, now Pat. No. 7,030,902.

(60) Provisional application No. 60/661,847, filed on Mar. 15, 2005, provisional application No. 60/263,498, filed on Jan. 23, 2001.

(51) Int. Cl.
*G03B 21/32* (2006.01)
*H04N 9/47* (2006.01)
*H04N 13/04* (2006.01)

(52) U.S. Cl. .............. 352/85; 348/53; 348/56

(58) Field of Classification Search ............... 348/42, 348/51, 53, 56, 57, 58, 59; 352/85, 86
See application file for complete search history.

(56) References Cited

U.S. PATENT DOCUMENTS

| | | | |
|---|---|---|---|
| 4,049,339 A | 9/1977 | Ledan | |
| 4,429,951 A | 2/1984 | Hirano | |
| 4,597,634 A | 7/1986 | Steenblik | |
| 4,705,371 A | 11/1987 | Beard | |
| 4,717,239 A | 1/1988 | Steenblik | |
| 4,805,988 A * | 2/1989 | Dones | 359/471 |
| 5,002,364 A | 3/1991 | Steenblik | |
| 5,144,344 A | 9/1992 | Takahashi | |
| 5,717,415 A * | 2/1998 | Iue et al. | 345/8 |
| 5,721,692 A | 2/1998 | Nagaya | |
| 6,385,245 B1 | 5/2002 | De Haan et al. | |
| 6,598,968 B1 | 7/2003 | Davino | |

* cited by examiner

*Primary Examiner*—Rodney E Fuller
(74) *Attorney, Agent, or Firm*—Lucas & Mercanti, LLP

(57) ABSTRACT

Pulfrich Filter Spectacles to view a 2-dimensional motion picture with 3-dimensional visual effects are disclosed. A method for synchronizing the Pulfrich filter spectacles and a method of displaying 2-dimensional motion pictures as 3-dimensional pictures using the spectacles are also disclosed. The Pulfrich spectacles and its synchronizing method and displaying method will allow almost any motion picture to be viewed effortlessly by the viewer with the visual effect of 3-dimensions.

8 Claims, 7 Drawing Sheets

100

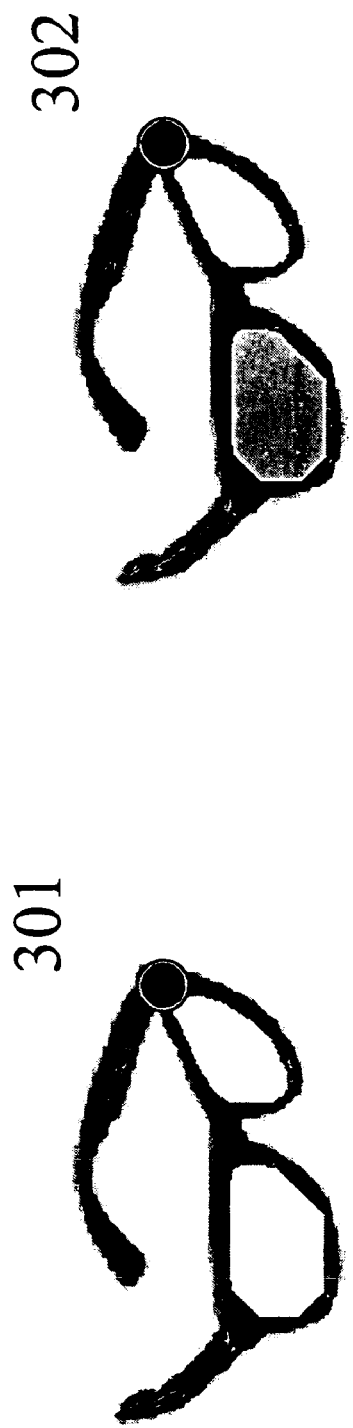
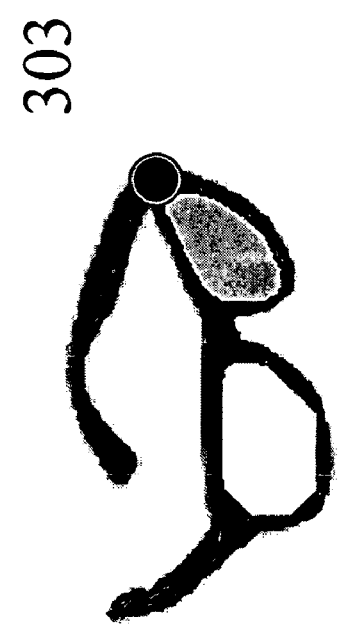
Figure 3a
Figure 3b
Figure 3c
Figure 3

600

If synchronization event NOT found then
　Continue looking for synchronization event
Else if synchronization event is found then
　If synchronization event is for no movement then
　　Set lens state to clear-clear
　Else if synchronization event is for left-to-right movement then
　　Set lens state to clear-tint
　Else if synchronization event is for right-to-left movement then
　　Set lens state to tint-clear

Figure 6

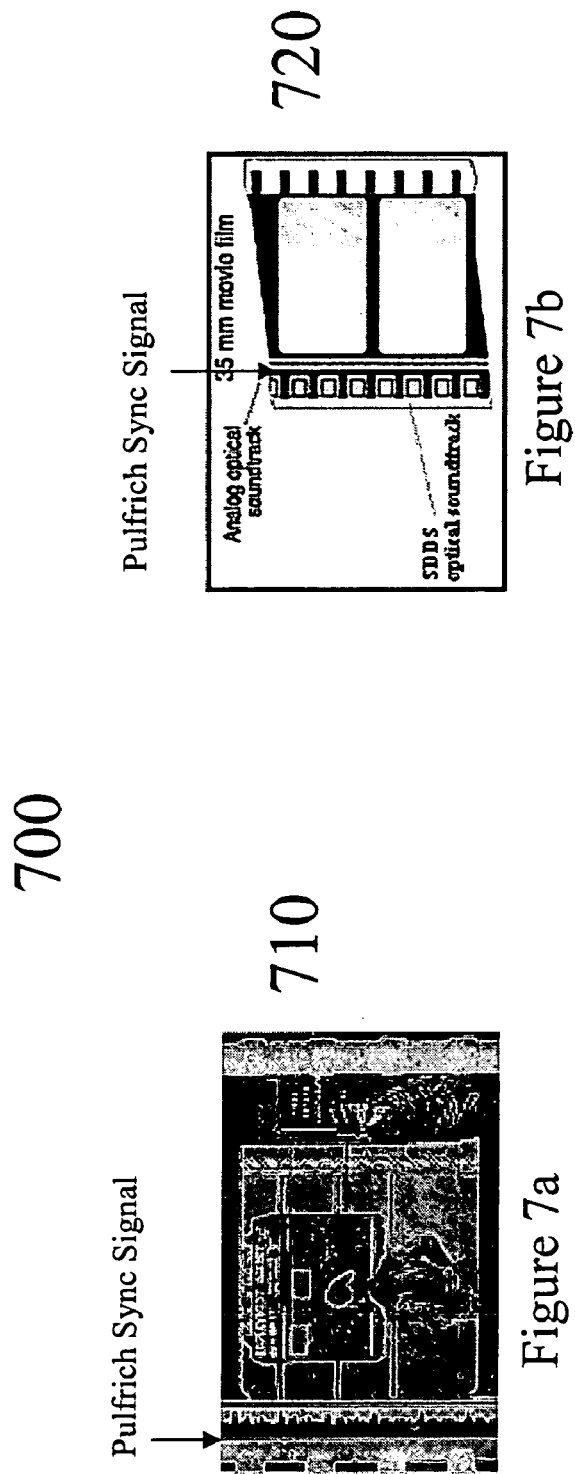
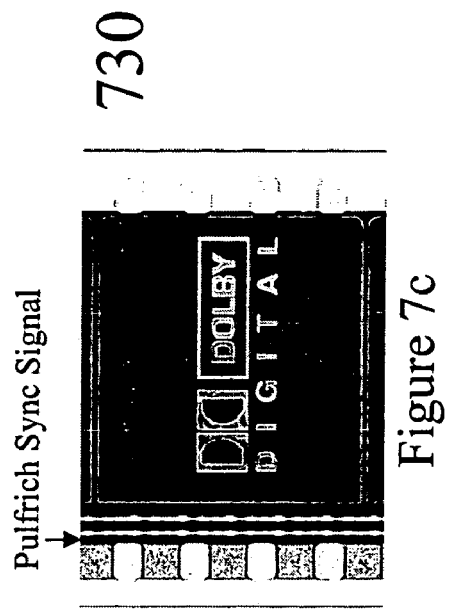
Figure 7a
Figure 7b
Figure 7c
Figure 7

SYSTEM AND METHOD FOR PULFRICH FILTER SPECTACLES

RELATED APPLICATION DATA

This application claims priority of U.S. Provisional Application No. 60/661,847 filed on Mar. 15, 2005, and is a continuation-inpart of application Ser. No. 10/054,607 filed on Jan. 22, 2002, now U.S. Pat. No. 7,030,902, which also claims priority of U.S. Provisional Application No. 60/263,498 filed on Jan. 23, 2001, with the entire contents of each application being herein incorporated by reference.

TECHNICAL FIELD

This invention relates to the field of motion pictures, and more specifically to a system that will allow almost any motion picture to be viewed effortlessly by the viewer with the visual effect of 3-dimensions.

PRIOR ART REFERENCES

A number of products and methods have been developed for producing 3-D images from two-dimensional images. Steenblik in U.S. Pat. Nos. 4,597,634, 4,717,239, and 5,002,364 teaches the use of diffractive optical elements with double prisms, one prism being made of a low-dispersion prism and the second prism being made of a high-dispersion prism. Takahaski, et al in U.S. Pat. No. 5,144,344 teaches the use of spectacles based on the Pulfrich effect with light filtering lens of different optical densities. Beard in U.S. Pat. No. 4,705,371 teaches the use of gradients of optical densities in going from the center to the periphery of a lens. Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

Davino, U.S. Pat. No. 6,598,968, '3-Dimensional Movie and Television Viewer', teaches an opaque frame that can be placed in front of a user's eyes like a pair of glasses for 3-D viewing to take advantage of the Pulfrich effect. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

Synchronization and Control

The Pulfrich Filter Spectacles invention makes use of signals to synchronize the lens filters to the lateral motion in the motion picture, and thus control the 3-dimensional visual effect for the viewer. In the preferred embodiment, this is implemented by modifying the soundtrack of a movie to include sounds beyond human hearing (ultrasonic sounds) that provide signaling at appropriate places/times in the course of presentation of a film to switch the filter to the appropriate eye. The Pulfrich Filter Spectacles have apparatus to detect these signals, respond and control individually the state of darkening of the lenses of the Pulfrich Filter Spectacles. Other embodiments of the invention use other means to synchronize the Pulfrich Filter Spectacles to the lateral motion in the motion picture, and control the 3-dimensional visual effect for the viewer.

Motion pictures have benefited from other types of synchronization and control information that is placed within the frames of motion pictures. However, these are characteristically different than the synchronization and control used in this invention.

In many motion pictures, to alert the movie theater projectionist that it is time to change reels, movie producers would place visible control information, in the form of a white circle appearing in the upper right upper hand corner of successive frames of the movie. When the projectionist sees this information, they know that it is time to start a second projector that has the next reel of the movie, and thus maintain an uninterrupted motion picture presentation.

Another means of communicating control information in motion picture frames is with the clapper slate board that indicates the start of a new scene when filming a motion picture. When filming motion picture or other type of video production, video and audio have been recorded separately. The two separate recordings must be precisely synchronized to insure that the audio recording matches the video image. Synchronization of the video and audio recordings has been accomplished using a clapper slate board. The audible clap created when a technician snaps the slate board in front of the camera is used during editing to manually synchronize the audio recording with the video recording. The editor simply views the video image of the snapping clapper slate, and then manually adjusts the timing of the audio recording such that the image of the clapper snapping shut and the sound of the clapper snapping shut are synchronized. Such synchronization can now be accomplished using electronic clapper slates. Electronic clapper slates display a Society of Motion Picture and Television Engineers (SMPTE) code, usually in large red light emitting diode numerals. The SMPTE code displayed is then used to electronically synchronize the video recording with a separate audio recording.

These types of synchronization and control information solve problems related to the synchronization of sound with filmed action during the production and editing of motion pictures, and related to changing reels of film during the presentation of motion pictures.

The preferred embodiment of the Pulfrich Filter Spectacles modifies the soundtrack of a motion picture to include sounds beyond human hearing that provide signaling at appropriate places/times in the course of presentation of a film to switch the filter to the appropriate eye. The preferred embodiment use Pulfrich Filter Spectacles with no moving parts and no wire connections using material that partially occludes or entirely clears in response to the received electronic signals. The Pulfrich Filter Spectacles have a means to receive, and process the motion picture audio soundtrack, and control the left and right lenses. In this way, the Pulfrich Filter Spectacles allows any motion picture with a degree of sustained lateral motion (for instance, every 'chase' sequence) to be viewed with the visual effect of 3-dimensions.

The 3-dimensional visual effect is produced by the Pulfrich Filter Spectacles regardless of whether the motion picture was shot on regular or digital film; regardless of whether the presentation media is film, digital film, VCR tape, or DVD, and; regardless of whether the motion picture is viewed in the movie theater, home TV, Cable TV, or on a PC monitor.

Post-production can be performed on the audio track of any motion picture, to identify synchronization events, and add (mix) to the soundtrack of the motion picture the sounds above human hearing that signal control of the Pulfrich Filter Spectacles, and that allow the film to be viewed with a 3-dimensional effect. Absent the Pulfrich Filter Spectacles, the viewer sees and hears the motion picture without the 3-dimensional effect.

BACKGROUND OF THE INVENTION

Visual effects have the potential to expand the viewing enjoyment of moviegoers. For example the movement effect 'Bullet Time' utilized in the movie 'The Matrix' was critical to the appeal of the movie.

Visual effects for 3-dimensional motion pictures have been used commercially since the early 1950s, and include such motion pictures as 'Charge at Feather River', starring Guy Madison. The 'Vincent Price movie 'House of Wax' was originally released as a 3-D thriller. The 3-D movie fad of the early to mid-1950s however soon faded due to complexity of the technologies and potential for improper synchronization, and alignment of left and right eye images as delivered to the viewer.

"Visual effects for 3-dimensional motion pictures have been used commercially since the early 1920s, and include such motion pictures as 'Charge at Feather River', starring Guy Madison. The 'Vincent Price movie 'House of Wax'was originally released as a 3-D thriller. The 3-D movie fad of the early to mid-1950s however soon faded due to complexity of the technologies and potential for improper synchronization, and alignment of left and right eye images as delivered to the viewer."

With the exception of Sony I-max 3-D presentations, which require special theater/screening facilities unique to the requirements of I-Max technology, 3-dimensional motion pictures remain a novelty. Despite the wide appeal to viewers, the difficulties and burden on motion picture producers, distributors, motion picture theaters, and on the viewers has been a barrier to their wide scale acceptance.

1. Vision

The Human Eye And Depth Perception

The human eye can sense and interpret electromagnetic radiation in the wavelengths of about 400 to 700 nanometers—visual light to the human eye. Many electronic instruments, such as camcorders, cell phone cameras, etc., are also able to sense and record electromagnetic radiation in the band of wavelengths 400-700 nanometer.

To facilitate vision, the human eye does considerable 'image processing' before the brain gets the image. As examples:

When light ceases to stimulate the eyes photoreceptors, the photoreceptors continue to send signals, or 'fire' for a fraction of a second afterwards. This is called 'persistence of vision', and is key to the invention of motion pictures that allows humans to perceive rapidly changing and flickering individual images as a continuous moving image.

The photoreceptors of the human eye do not 'fire' instantaneously. Low light conditions can take a few thousands of a second longer to transmit signals than under higher light conditions. Causing less light to be received in one eye than another eye, thus causing the photoreceptors of the right and left eyes to transmit their 'pictures' at slightly different times, explains in part the Pulfrich 3-D illusion, which is utilized in the invention of a Pulfrich Filter Spectacles.

Once signals are sent to the eye, the brain process the dual stereo images together (images received from the left and right eye) presenting the world to the human eye in 3-dimensions or with 'Depth Perception'. This is accomplished by several means that have been long understood.

Stereopsis is the primary means of depth perception and normally requires sight from both eyes. The brain processes the dual images, and triangulates the two images received from the left and right eye, sensing how far inward the eyes are pointing to focus the object.

Perspective uses information that if two objects are the same size, but one object is closer to the viewer than the other object, then the closer object will appear larger. The brain processes this information to provide clues that are interpreted as perceived depth.

Motion parallax is the effect that the further objects are away from us, the slower they move across our field of vision. The brain processes motion parallax information to provide clues that are interpreted as perceived depth.

Shadows provide another clue to the human brain, which can be perceived as depth. Shading objects, to create the illusions of shadows and thus depth, is widely used as in the shading of text to produce a 3-dimensional impression without actually penetrating (perceptually) the 2-D screen surface.

2. 3-D Motion Pictures

Methods of Producing 3-D Illusion in Moving Pictures

Motion pictures are images in 2-dimensions. However, several methods have been developed for providing the illusion of depth in motion pictures. These include the Pulfrich, and Analglyph 3-dimensional illusions.

Analglyph 3-Dimensional Illusion

"Analglyph" refers to the red/blue or red/green glasses that are used in comic books and in cereal packets etc. The glasses consist of nothing more than one piece of transparent blue plastic and one piece of transparent red plastic. These glasses are easy to manufacture and have been around since the 1950s.

An analglyph stereo picture starts as a normal stereo pair of images, two images of the same scene, shot from slightly different positions. One image is then made all green/blue and the other is made all red, the two are then added to each other.

When the image is viewed through the glasses the red parts are seen by one eye and the other sees the green/blue parts. This effect is fairly simple to do with photography, and extremely easy to do on a PC, and it can even be hand-drawn. The main limitation of this technique is that because the color is used in this way, the true color content of the image is usually lost and the resulting images are in black and white. A few images can retain their original color content, but the photographer has to be very selective with color and picture content.

Pulfrich 3-Dimensional Illusion

Pulfrich was a physicist that recognized that images that travel through a dark lens take longer to register with the brain than it does for an image that passes through a clear lens. The delay is not great—just milliseconds—just enough for a frame of video to arrive one frame later on the eye that is covered by a darker lens than a clear lens. Pulfrich spectacles then have one clear lens (or is absent a lens) that does not cause a delay, and one darkened lens that slightly delays the image that arrives to the eye. In a motion picture viewed through Pulfrich lenses, for an object moving laterally across the screen, one eye sees the current frame and the other eye a previous frame.

The disparity between the two images is perceived as depth information. The brain assumes both frames belong to the same object and the viewer's eyes focus on the object as if it were closer than it is. The faster the object moves, the more separation there is between the time-delayed images, and the closer the object appears. The fact that faster objects appear closer than slower objects also coincides with the principles of motion parallax. Generally, however, the greater displacements frame to frame (and now eye to eye) result from degrees of closeness to the recording camera (proximity magnifies), so that Pulfrich viewing can deliver an approximately correct and familiar depth likeness. While the depth likeness is unquestionably 3-D, it may differ from the fixed constant of an individual's inter-ocular distance when observing the world directly. Few observers will notice this anymore than they are bothered by the spatial changes resulting from use of telephoto or wide-angle lens in filming scenes.

Motion pictures made for the Pulfrich method can be viewed without any special glasses—appearing as regular motion pictures minus the 3-D effect. Also, motion pictures made without regard for the Pulfrich effect, will still show the 3-D visual effect if lenses are worn and appropriately configured.

The limitation of the Pulfrich technique is that the 3-dimensional illusion only works for objects moving laterally or horizontally across the screen. Motion pictures made to take advantage of these glasses contain lots of horizontal tracking shots or rotational panning shots to create the effect. Pulfrich, who first described this illusion, was blind in one eye, and was never able to view the illusion, though he completely predicted and described it.

A basic example of the Pulfrich illusion can be seen by viewing either of two TV stations. The news headlines on the CNN Television network or the stock market quotations on CNBC scroll in from the right of the TV screen and across and off the screen to the left. The news or quotations appear in a small band across the bottom of the screen while the network show appears above the scrolling information. When either of these network stations is viewed through Pulfrich glasses, with the darkened lens covering the left eye and the clear lens covering the right eye, the scrolling information appears in vivid 3-dimensions appearing to be in front of the TV screen. If the lenses are reversed with the clear lens covering the left eye and the darkened lens covering the right eye, the scrolling information appears to the viewer as receded, and behind the TV screen.

Another example of the Pulfrich illusion can be seen in the movie 'The Terminator', starring Arnold Schwarzenegger. Any off-the-shelf copy of the movie—VCR tape, or DVD, can be viewed on a TV or PC playback display monitor as originally intended by the filmmaker. But, viewing scenes that include lateral motion from 'The Terminator', such as the scene when Sarah Connors enters a bar to call police (about 29 minutes into the movie) when viewed through Pulfrich glasses (left eye clear lens and right eye dark lens) shows the scene vividly in 3-dimensions, even though this visual effect was totally unintended by the director and cinematographer.

Another stunning example is the famous railroad yard scene from "Gone with the Wind", in which Scarlett O'Hara played by Vivien Leigh walks across the screen from the right as the camera slowly pulls back to show the uncountable wounded and dying confederate soldiers. When viewed through Pulfrich glasses with (left eye clear lens and right eye dark lens), the scene appears to the user in 3-dimensions, even thought it was totally unintended by the director and cinematographer. Interesting here is that the main movement of this scene was created by the camera lifting and receding and so expanding the view. Effective lateral motion resulting from such camera movement would in fact be to only one side of the screen, which the viewers will utilize to interpret the entire scene as in depth.

The Pulfrich Filter Spectacles will allow any movie, such as "Gone with the Wind" which was shot in 1939, to be viewed in 3-dimensions. In the preferred embodiment, all that is necessary is post-production be performed on the motion picture, to identify synchronization events, and add (mix) to the soundtrack of the motion picture the sounds above human hearing that signal control of the Pulfrich Filter Spectacles, and that allow the film to be viewed with a 3-dimensional effect. Absent the Pulfrich Filter Spectacles, the viewer sees and hears the motion picture 'Gone with the Wind' as originally filmed.

Note that the Pulfrich 3-D effect will operate when the left or right filtering does not correspond with the direction of an image's movement on the screen. The depth-impression created is unnatural, a confusion of solid and open space, of forward and rear elements. When confronted by such anomalous depth scenes, most minds will 'turn off', and not acknowledge the confusion. For normal appearing 3-D, mismatched image darkening as related to the direction of the image's movement on the screen must be avoided.

We have described the need to match horizontal direction of foreground screen-movement to Left or Right light-absorbing lens. This, however, is a rule that often has to be judiciously extended and even bent, because all screen-action appropriate to Pulfrich 3-D is not strictly horizontal; horizontal movements that angle up or down, that have a large or even dominant element of the vertical, may still be seen in depth. Even a single moving element in an otherwise static scene can be lifted into relief by way of an adroit application of a corresponding Pulfrich filter. There would even be times when a practiced operator would choose to schedule instances of lens-darkening contrary to the matching-with-foreground-direction rule; the explanation for this lies in the fact that the choice of left or right filter-darkening will pull forward any object or plane of action moving in a matching direction, and there are times when the most interesting action in a picture for seeing in 3D could be at some distance from the foreground, even requiring a Left/Right filter-match at odds with the filter-side that foreground-movement calls for. For instance, if one wished to see marchers in a parade marching Left, to lift them forward of their background would require darkening of the Left lens, but foreground movement could be calling for a Right lens darkening; this would be a situation when a choice might be made to over-ride the foreground-matching rule. In most instances the rule is to be followed, but not mechanically; screen movement is often compound and complex, and an observant individual could arrange a Pulfrich timing for a movie with an alertness to such subtleties that did not limit decisions to recognition of foreground direction alone. As mentioned earlier, there would even be times, when the recording camera had moved either forward or backwards through space, when both Left and Right lenses would half-darken to either side of their centers, outer halves darkening moving forward (with picture elements moving out to both sides from picture-center) or both inner halves darkening when retreating backwards (with picture elements moving in towards center from each side).

One might think that alternating between the screenflatness of a dialogue scene and the deep space of an action scene would disrupt the following of a story. In fact, just as accompanying movie-music can be intermittent while entirely supporting a story development, dialogue is best attended to with the screen flat and action-spectacle is most effective given the dimension and enbanced clarity of depth. Usually a function of lighting specialists, it is at ays necessary to make objects and spaces on a flat screen appear distinct from each other; besides making a scene move convincing, 3-D separation of forms and of spatial volumes one from the other speeds up the "reading" of what are essentially spatial events. This is to say:

flat can best enable concentration on dialogue; depth-dimension can most effectively deliver action scenes. Alternating between 2-D and 3-D awareness is something we even do, to a degree, in our experience of actuality, as a function of our changing concentration of attention; just as we hear things differently when we concentrate on listening Then, too, making sense of movies is a thing we learn to do, as different from life-experience as a movie is with its sudden close-ups and change of angle and of scene, its flashbacks, et cetera. Movie viewing is a learned language, a form of thinking; the alternating of flat-screen information with depth-information will be as readily adapted to as many other real-world-impossibility accepted without question as natural to the screen.

In the preferred embodiment of the Pulfrich Filter Spectacles invention—we focus on a better means to present the Pulfrich 3-D illusion in motion pictures by precisely signaling the synchronization of the Pulfrich Filter Spectacles lenses to the motion picture. In other embodiments of the invention, similar principles can be utilized to present other illusions or special effects in motion pictures.

Problems with 3-D Motion Pictures

With the exception of Sony I-Max 3-d, a special cine-technology requiring theaters exclusively designed for its screening requirements, 3-dimensional motion pictures have never caught on except as a short-term fad, because a myriad of problems continue to make 3-dimensional motion pictures unacceptable to producers and viewers of motion pictures. Despite concerted efforts, 3-dimensional motion pictures continue to be nothing more than a novelty. There are many problems and constraints involving the production, projection, and viewing of 3-dimensional motion pictures.

Production: The commonly used analglyph 3-dimensional movie systems require special cameras that have dual lenses, and capture 2-images on each frame. To have a version of the motion picture that can be viewed without special glasses requires that a separate version of the motion picture be shot with a regular camera so there is only one image per video frame or special re-photography and re-printing of the 3-D motion picture is required.

Projection: Some 3-dimensional systems require the synchronization and projection by at least 2 cameras in order to achieve the effect. "Hitachi, Ltd has developed a 3D display called Transpost 3D which can be viewed from any direction without wearing special glasses, and utilize twelve cameras and rotating display that allow Transpost 3D motion pictures that can be seen to appear as floating in the display. The principle of the device is that 2D images of an object taken from 24 different directions are projected to a special rotating screen. On a large scale this is commercially unfeasible, as special effects in a motion picture must be able to be projected with standard projection equipment in a movie theater, TV or other broadcast equipment.

Viewing: As a commercial requirement, any special effect in a motion picture must allow viewing on a movie screen, and other viewing venues such as TV, DVD, VCR, PC computer screen, plasma and LCD displays. From the viewers vantage, 3-dimensional glasses, whether analglyph or Pulfrich glasses, which are used in the majority of 3-dimensional efforts, if poorly made or worn incorrectly are uncomfortable and may cause undue eye strain or headaches. Experiencing such headache motivates people to shy away from 3-D motion pictures.

Polaroid projection requires a metallic-surface screen. Should the two film-strands used in a double-projection screening lose synchronization or precise screen alignment, the effect is sure to cause great discomfort, as well as loss of the 3D illusion.

Because of these and other problems, 3-dimensional motion pictures have never been more than a novelty. The inconvenience and cost factors for producers, special equipment projection requirements, and viewer discomfort raise a sufficiently high barrier to 3-dimensional motion pictures that they are rarely produced. A main object of this invention is to overcome these problems and constraints.

Attempts to Overcome the Problems of 3-D Motion Pictures

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it. Recent advances have eliminated mechanical shutter, and now use lens that turn opaque when an electric current is passed through it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weight only 3.3 ounces, use two 3V lithium/manganese dioxide batteries, and have a battery life of 250 hours. This demonstrates the robustness and potential of a viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

However, shutter systems have not been overwhelmingly commercially successful. Motion pictures that use such stereo shutter systems require two frames for each frame of regular film. Motion pictures would then have to be produced in at least 2 versions. Also, except on high refresh rate systems, such as expensive PC monitors, the viewer sees too much 'flicker' causing distraction and annoyance. An additional requirement and burden is the wired or wireless signaling to control the state of the lens. LCD screens that are used on laptops generally do not have high enough refresh rates for stereoscopic shutter 3D systems. Shutter systems generally do not work well with LCD or movie projectors.

In the preferred embodiment of this invention, in a manner similar to that used with some versions of shutter glasses, we utilize lens materials that are clear when no current is passed through it, but partially occluded or darkened when a current above a threshold voltage is passed through it.

SUMMARY OF THE INVENTION

Preferred embodiments of the Pulfrich Filter Spectacles invention solve the foregoing (and other) problems, and present significant advantages and benefits by providing a system to view 3-dimensional and other special effects in motion pictures. It is, therefore, an object of the preferred embodiment of the invention to provide a system by which ordinary 2-dimensional motion pictures can be viewed in part as a 3-dimensionsal experience.

The Pulfrich Filter Spectacles achieves this by taking advantage of the well-known Pulfrich effect, through which lateral motion of an ordinary motion picture will appear to the viewer in 3-Dimensions.

The soundtrack of a motion picture is modified by adding:
  (a) Sounds beyond human hearing (or ultrasound) that provide electronic signaling at appropriate places/times in the course of presentation of a motion picture to switch the filter to the appropriate eye.

Viewing spectacles, worn in the ordinary way as other glasses, are configured with:
  (b) Right and left lenses for which the partial darkening of the glasses can be individually controlled
  (c) Means to receive the sounds beyond human hearing that provide the signaling at appropriate places/times in the course of presentation of a film to switch the filter to the appropriate eye
  (d) Means to identify the sounds beyond human hearing and identify the synchronization vents, and
  (e) Means to provide individual control for the darkening of the right and left hand lenses based on the identified synchronization events.

Unlike prior inventions that used shutter glasses, in the preferred embodiment of the invention, the control for the viewing glasses is not a wired, wireless or infrared signal, but information included, or added in the soundtrack of the motion picture. We add to viewing glasses that have lenses for which the partial darkening can be individually controlled, a means to receive the audio sound, identify the synchronization signals in the sound above human hearing (also called ultrasound) that are included on the motion picture soundtrack, and use the identified synchronization information to control the state of the Pulfrich Filter Spectacles right and left lenses to produce the desired video effect.

In the preferred embodiment, the lenses of the viewing spectacles may take 3 different states; (a) clear-clear for the right and left eyes; (b) clear-darkened for the right and left eyes, and; (c) darkened-clear for the right and left eyes. In other embodiments, the lenses may be capable of various other states that correspond to different levels of darkening.

In the preferred embodiment, the viewing glasses look just like ordinary glasses—2 lenses, earpieces, and a nose rest. The viewing glasses also have an attached audio sensor that 'hears' the soundtrack of the motion picture, identifies the synchronization and control signal sounds that are above human hearing. In response to the identified synchronization events, the Pulfrich Filter Spectacles cause the lenses of the viewing glasses to assume the appropriate right-left lens states.

In this way the viewing glasses work regardless of the viewing media—TV, film, DVD, computer monitor, liquid crystal display, plasma display, etc.

The preferred embodiment of the Pulfrich Filter Spectacles invention overcomes problems of providing 3-dimensional illusions in motion pictures and achieves the following major benefits:

1. No special equipment is needed for the filming of the motion picture. Ordinary film or digital technology can be used to shoot the movie. The motion picture can even be the result of animation.
2. The only post-production modifications to the motion picture that are necessary are:
  a. Identify the appropriate place/times in the course of the presentation at which to switch the filter to the appropriate eye
  b. Modifying the soundtrack of a movie to include sounds beyond human hearing that indicate the synchronization event
3. Works equally well whether the movie is released in any of the various film or digital formats.
4. Allows older or motion pictures produced before the invention of the Pulfrich Filter Spectacles to be viewed with a 3-dimensional effect.
5. No special equipment is needed for the projection of the motion picture. The movie can be viewed on a TV, DVD player, PC, or in a movie house.
6. The battery-powered viewer glasses are controlled in real-time by the synchronization sounds above human hearing on the soundtrack of the motion picture, so 3-dimensional viewing works equally well whether the movie is viewed on a TV, DVD player, PC, or in a movie house.
7. Since darkening of the lenses to obtain the 3-dimensional illusion is only activated when sustained lateral motion is indicated by the synchronization even, eyestrain and discomfort is greatly reduced.

BRIEF DESCRIPTION OF THE DRAWINGS

Many advantages, features, and applications of the invention will be apparent from the following detailed description of the invention that is provided in connection with the accompanying drawings in which:

FIG. 3 is a block diagram showing 3 different right and lens configurations and how they are synchronized to the foreground lateral motion of the motion picture, in which, FIG. 3a shows the lens states with the both the right and left lenses clear; FIG. 3b shows the lens states with the left lens clear and the right lens darkened; and FIG. 3c shows the lens states with the left lens darkened and the right lens clear.

FIG. 6 is the decision procedure used by the real-time control algorithm to control the state of viewer glasses.

FIG. 7 show various alternative means by which the Pulfrich Filter Spectacles synchronization signals can be incorporated into motion picture, in which, FIG. 7a shows synchronization signals being included in a single monaural sound channel of a sound-on-film; FIG. 7b shows synchronization signals being included in the Sony Dynamic Digital Sound (SDDS) digital sound film format; and FIG. 7c shows synchronization signals being included in the Dolby Stereo Digital (SR-D) format.

DETAILED DESCRIPTION OF THE PREFERRED EMBODIMENT

Figure 1:
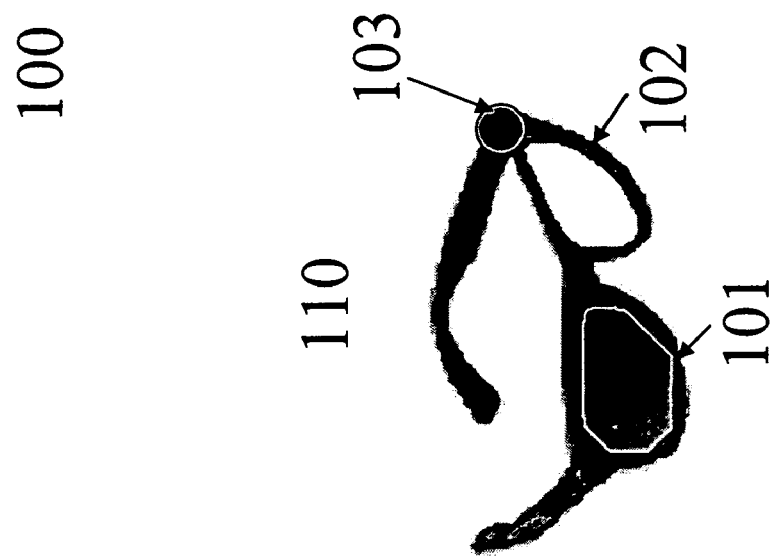
FIG. 1 is a block diagram illustrating a preferred embodiment of the Pulfrich Filter Spectacles.

Preferred embodiments and applications of the invention will now be described with reference to FIGS. 1-7. Other embodiments may be realized and structural or logical changes may be made to the disclosed embodiments without departing from the spirit or scope of the invention. Although the invention is particularly described as applied to the viewing of motion pictures that include scenes that can benefit from the Pulfrich 3-dimensional illusion, it should be readily apparent that the invention may be embodied to advantage for other visual effect.

In particular, the invention is readily extendable to other embodiments resulting in other motion picture video effect that result from the control of viewer spectacle synchronized to motion picture events. The preferred embodiments use ultrasound in the soundtrack of the motion picture to identify the synchronization events. Other embodiments may use electromagnetic, radio frequency, light or other means to signal the synchronization events, including optional viewer over-riding of the system, manual-switching by way of a hand-remote with 3 buttons or a 3-position toggle switch. Still other embodiments may embed visual clues in the frames of the motion picture to operate as signals to the synchronization events.

Technologies Utilized in the Invention

Substances That Change Color and Transparency

Objects that change color have been well known for a long time. Animate creatures such as cephalopods (squid) have long been known for their ability to change color seemingly at will, by expanding or retracting chromatophore cells in their body.

There are many different technologies that are used to cause physical materials to change their color and transparency. These may react to heat, light, ultraviolet light, or electronic means to change their state, which in turn affect how they reflect and refract light, or their properties of transparency, or translucency.

For instance, photochromatic lenses automatically darken in sunlight and lighten when indoors, and have been utilized in sunglasses for many years. Some may darken instantaneously, and others have lenses that take several different shades depending upon the intensity of the light presented.

Thermochromatic materials are heat activated, causing the color to change when the activation temperature is reached, and reverse the color change when the area begins to cool. These are used in such products as inks, and strip thermometers.

LEDs (Light Emitting Diodes) are electronic diodes that allow current to flow in one direction and not the other. LEDs have the unique "side effect" of producing light while electricity is flowing through them. Thus they have two states— when electricity flows through them they are 'on' and emit light, or 'off' when no electricity flows through them and they do not emit light.

Phosphors are emissive materials that are used especially in display technologies and that, when exposed to radiation, emits light. Any fluorescent color is a phosphor. Fluorescent colors absorb invisible ultraviolet light and emit visible light at a characteristic color. In a CRT, phosphor coats the inside of the screen. When the electron beam strikes the phosphor, it makes the screen glow. In a black-and-white screen, there is one phosphor that glows white when struck. In a color screen, there are three phosphors arranged as dots or stripes that emit red, green and blue light. In color screens, there are also three electron beams to illuminate the three different colors together. There are thousands of different phosphors that have been formulated, and that are characterized by their emission color and the length of time emission lasts after they are excited.

Liquid crystals are composed of molecules that tend to be elongated and shaped like a cigar, although scientists have identified a variety of other, highly exotic shapes as well. Because of their elongated shape, under appropriate conditions the molecules can exhibit orientational order, such that all the axes line up in a particular direction. One feature of liquid crystals is that electric current affects them. A particular sort of nematic liquid crystal, called twisted nematics (TN), is naturally twisted. Applying an electric current to these liquid crystals will untwist them to varying degrees, depending on the current's voltage. These crystals react predictably to electric current in such a way as to control light passage.

Still another way to alter the amount of light that passes through a lens is with Polaroid lenses. Polaroids are materials that preferentially transmit light with polarization along one direction that is called the polarization axis of the Polaroid. Passing unpolarized light through a Polaroid produces transmitted light that is linearly polarized, and reduces the intensity of the light passing through it by about one-half. This reduction in light from a first Polaroid does not depend on the filter orientation. Readily available optically active materials are cellophane, clear plastic table ware, and most dextrose sugars (e.g. Karo syrup). Materials that alter the polarization of light transmitted through them are said to be optically active.

If two Polaroids are placed immediately adjacent to each other at right angles (crossed) no light is transmitted through the pair. If two similar Polaroids immediately adjacent to each other are in complete alignment, then the second Polaroid does not further reduce the intensity of light passing though the first lens. Additional reduction of light intensity passing through the first polaroid lens will occur if the two similar polaroids immediately adjacent to each other are in other then complete or right angle alignment. This can be beneficially used in other embodiments of the invention to more precisely control the intensity of light passing through the Pulfrich Filter Spectacles lenses.

Polaroids can be actively controlled by electronic currents, and are used in such products such LCD displays. For example digital watches often use LCD display for the display of time. In such products, there is a light source behind two layers of LCD materials. Electronic current is used to control the polarity of specific areas of the two layers. Any area of the screen for which the two Polaroid layers are at right angles to each other will not pass any light—other areas will allow light to pass. In this manner, the alphanumeric information of LCD can be electronically controlled and displayed on an LCD display.

Another technology to control the intensity of light passing through the lenses includes directional filters such as the micro-louver.

In the preferred embodiment of this invention, we utilize liquid crystals for the lenses that change transparency when an electronic current is passed through them. In particular, we use a substance that is darkened (allowing some light to pass through) when current is applied across it, but is totally clear and transparent and allows light to pass unhindered when no current is applied to it. In other embodiments of the invention, other substances and technologies could be used that allow the lenses to change their color, or their properties of transparency or translucency.

Sounds Beyond Human Hearing

Sound is vibrational energy or a pressure disturbance propagated through a medium and displacing molecules from a state of equilibrium. It is mechanical energy in the form of pressure variances in an elastic medium. These pressure variances propagate as waves from a vibrating source. The auditory perception of this disturbance is something heard by the ears. Sound perception is not only used for human hearing but ultrasonic sound is used as sonar or echo-location by animals such as bats. High frequency ultrasonic waves are used in a system called 'sound navigation and ranging' or sonar. Different species have widely different audible hearing ranges.

For human the hearing range is 20-20,000 Hz. Many animals have audible hearing that exceed the frequency range of human hearing. Dogs have a hearing range of 67-45,000 Hz; cats 45-64,000 Hz; cows 23-35,000 Hz; rabbits 360-42,000 Hz; mice 1,000-91,000 Hz; and bats 100-100,000 Hz. Sea mammals have even higher top ranges. The range for a beluga whale is 1,000-123,000 Hz and for the porpoise the range is 75-150,000 Hz. Some animals then can hear sound 2-3 octaves higher than humans.

The audible sound frequency spectrum for humans or the range of frequencies audible to human hearing is about 20 to 20,000 Hz Sound, and is commonly grouped into 3 categories. Infrasonic sound is the frequency range below those frequencies audible to human hearing. The audible range is 20 to 20,000 Hz, and ultrasonic sound is sound frequencies above the range of human hearing. Ultrasonic sound is utilized in the preferred embodiment of the invention as signals for the synchronization of the Pulfrich Filter Spectacles lenses to the lateral motion in the motion picture.

The audible sound frequency spectrum for humans is further categorized into three parts. The low-end range of the audible frequency spectrum, usually 20 to 320 Hz is the bass range. The parts of the frequency spectrum to which humans are most sensitive are the frequencies between 320 and 5,120 Hz, commonly referred to as the mid-range. Treble is the frequency range between roughly 5,000 and 20,000 Hz, the highest two octaves in the audible frequency spectrum. Most normal conversation takes place in the frequency range from 500 to 3,000 Hz.

Ultrasound is commonly used in commercial products. Ultrasound monitoring is the use of high frequency sound to form an image or picture of internal organs for immediate medical diagnostic purposes. The Ultrasonography device transmits sound waves directly into the body and then accurately records the amount of time for echoes to return to a receiver, much like radar. The sound waves used are at frequencies above the threshold of human hearing.

Another commercial device is the SongFinder Plus that allows users to hear animal sounds (including ultrasonic bat sounds) up to around 45,000 Hz, even if the user suffers from severe high frequency hearing loss. The Songfinder is a digital instrument that takes as input sounds (from birds, insects, bats) above 3,000-4,000 Hz which are then converted into digital signals that are acted upon by an internal DSP (digital signal processor) to lower the sound into a frequency range where one still has normal or near-normal hearing. Note the SongFinder is not amplifying sound. Rather, for instance in the case of a bat, it uses digital signal processing to change the ultrasonic frequency of bat sound into frequency ranges audible to human hearing by lowering the frequencies and then adding them at normal or at slight to moderate amplification, to what one already hears.

One benefit of using ultrasonic sounds above human hearing is that it will not go through walls. Thus the preferred embodiment of the Pulfrich Filter Spectacles can be used without problem in multiplex cinema theaters that show different movies in closed adjacent theaters. Similarly, no interference will occur when used in separate rooms of the house to view separate Televisions.

Audio Electronic Components and Digital Sound Processing

Transducers are common electronic components that can convert sound into a voltage. In the preferred embodiment of the invention, a transducer is used to pickup the audio soundtrack of the motion picture, and converts it to an electronic format for processing.

In other embodiments an ultrasonic transducer may be used to isolate and only pickup the ultransonic Pulfrich Filter Spectacles synchronization and control signals from the audio soundtrack of the motion picture.

Filters are common electronic components used in the processing of sound and that remove unwanted frequencies from a signal. A bandpass filter attenuates frequencies above and below a selected bandwidth, allowing the frequencies between to pass. A highpass (lowcut) filter attenuates frequencies below a selected frequency and allows those above that point to pass. Notch filters are capable of attenuating an extremely narrow bandwidth of frequencies. In the preferred embodiment of the invention, a highpass filter is used to filter out audible sound, so only the ultrasonic Pulfrich Filter Spectacles synchronization signals are processed.

Analog To Digital Converter (ADC) are electronic components in which incoming analog electrical signals are sampled at very short, regular intervals. The ADC generates a stream of numbers that are equivalent to the voltage received at each interval. An ADC will be utilized in the preferred embodiment of the invention to convert the sound from analog to digital form for digital signal processing (DSP).

The invention will utilize digital signal processing (DSP) of the digitized signal to identify the synchronization events. DSP are commonly used techniques that provides various manipulations of sound in digital format using complex algorithms.

Adding signals to audio signals to achieve effect is common in the processing of sound. This can be accomplished using an analog or digital mixer to combine the soundtrack with the ultransonic sounds above human hearing that signal the synchronization events.

For instance, bias or inaudible DC or AC signal is added to an audio signal to overcome nonlinearities of amplification or of the medium. In magnetic tape recording, extremely high frequency ultrasonic (sounds above human hearing) AC bias is used to linearize the tape medium, which would otherwise be highly distorted. Masking is a common technique for the hiding of some sounds by other sounds when each is a different frequency and they are presented together. The SMPTE time code, also know as the longitudinal time code, is a high-frequency signal consisting of a stream of pulses produced by a time code generator used to code tape to facilitate editing and synchronization. Overdubbing is a commonly used technique allowing the recording of new material on a separate tape track(s) while listening to the replay of a previously recorded tape track(s) in order to synchronize the old and new material. Rerecording is the process of combining individual dialogue, sound effects, and music tracks into their final form—stereo or surround sound. Synchronization using the sound track is not a new technique. The sync tone is a tone or pulse that synchronizes tape recorder speed and film camera speed in double system recording. The sync pop is a single frame of magnetic film with a 1,000 Hz tone that creates a beep called the sync beep. Techniques similar to these commonly used techniques may be utilized to modify the soundtrack of the motion picture with Pulfrich Filter spectacles synchronization events.

In the preferred embodiment of the invention, ultrasonic beeps or sound beyond human hearing are added to the soundtrack of the motion picture to indicate synchronization events between lateral movement in the motion picture and the Pulfrich Filter Spectacles. Other embodiments may use a track or channel on a DVD or other digital recording (or analog) format as the carrier of the Pulfrich Filter Spectacles synchronization signal.

Wireless Transmitting Receiving Technologies

The preferred embodiment of the invention uses audio in the soundtrack of the movie to signal the synchronization events to the Pulfrich Filter Spectacles. Other non-audio technologies, such as electromagnet, radio frequency, or optical technologies could be utilized in other embodiments of the inventions to signal the synchronization events to the Pulfrich Filter Spectacles.

Broadcast Signals for Synchronization

The preferred embodiment only requires a 1-way or broadcast synchronization signal transmitted through the audio soundtrack of a motion picture as inaudible ultrasonic beeps. Other embodiments may use other means to transmit the synchronization signals.

Electromagnetic radiation (EMR) refers to all type of energy that travels and spreads out as it goes. This includes visible light that comes from a lamp, or radio waves that come from a radio station. Other examples of EMR radiation are microwaves, infrared and ultraviolet light, X-rays and gamma-rays. Other embodiments may use other means to broadcast the synchronization signals, including, but not limited to, electromagnetic radiation, radio, or light.

Electromagnetic, radio frequency and light are already in use in many commercial products as the medium for transmitting synchronization and control signals.

One example is the garage door opener. Garage door openers use radio frequency (RF) waves for signal and control. A garage door opener has three parts; a wireless remote transmitter that transmits an encrypted RF coded signal to open or close the garage door; a receiver that can receive and recognizes the encrypted RF coded signal and can control the opening and closing of the garage door, and; a motor on the ceiling of the garage to open or close the garage door.

Another example is the TV remote controller which uses light, specifically infrared (IR) light to control the operation of a TV, VCR or other electronic device. A TV remote control allows a user to press a (sequence) key on the control pad of the remote controller, which is transmitted by infrared light to the controlled appliance. The appliance has an infrared receiver that can receive, identify, and respond to the coded signal and control the appliance. At the end of the remote controller there is an infrared LED, or Light Emitting Diode. While many LEDs produce visible light, the LED of a remote control generally uses infrared light that is invisible to the human eye. It is not invisible to all visual sensors. Electronic sensors, such as the CCD elements in the modern video cameras are also sensitive to IR radiation and can see and record infrared light. The receiver in the appliance controlled by the remote controller can similarly see the infrared light, and reacts to it appropriately.

"Another commercial product that uses infrared light for communications are Personal Digital Assistants or PDAs. PDAs generally have application programs to allow synchronization of data between the PDA and a base computer. PDAs include an IR or infrared port that allows a user to send synchronization data without a cable via infrared Waves. It works similarly to the way the TV remote control beams instructions to your television. For instance, every device with the Palm operating system (or PalmOS) onboard has an IR port. That includes Palm-brand hand-held computers as well as devices made by Handspring as well as the Sony Clie and TRG Pro devices. Applications running on the transmitting PDA, and on a receiving computer, allow data 'beamed' from the transmitting PDA to be sent via the IR port of the receiving station and keep information between the two computer devices synchronized."

Still another example is the inexpensive children's toys that allow a wireless FM Microphone to transmit directly through any FM radio. These battery operated devices allow a user to transmit on a preset FM frequency for reception by a tuned channel on an FM radio. These low-power devices have limited range and broadcast without interfering with the station broadcast outside the limited proximate area of the toy, and so does not require any FCC licensure. Another similar device is the FM transmitters that plug into the Apple iPod headphone jack and broadcasts the audio signal over a chosen FM frequency allowing the user to hear the music through a nearby radio.

Network Signals for Synchronization

While the preferred embodiment of the invention only requires a means to broadcast synchronization signals to the Pulfrich Filter Spectacles, other embodiments of the invention may benefit by the use of network, 2-way, or conversational signaling systems. For instance, Digital Cinema Projectors are comprehensive digital cinema appliances that combine high-quality and high-performance audio/visual motion picture projection with digital video and audio processing and computer networking capability. Other embodiments of the invention may beneficially place the transmission of the signal in the Digital Cinema Projectors. Since Digital Cinema Projectors include powerful computers with networking capabilities, benefit may derive by broadcasting the synchronization signals using already established networking protocols. Also, benefit can be derived by allowing the Pulfrich devices to communicate and register themselves with the cinematic projectors.

Wifi and Bluetooth are two universally accepted standards that may be utilized in other embodiments of the invention as a medium for communication of synchronization signals to the Pulfrich Filter Spectacles. Wifi is the wireless implementation of networking. It is also known as 802.11 networking and has an advantage of simplicity and low cost. Wifi enabled devices connect to the network using radio signals, and will work within the proximate distances for home TV viewing or theater viewing. Bluetooth is another widely accepted standard for wireless connectivity that is low-power, inexpensive, and allows devices to recognize each other and self-connect into a dynamic network. Because of its short operational distance it may be limited to Pulfrich Filter Spectacles for home viewing.

Miniature Special Purpose Computers

The miniaturization of computers has advanced at a continuing and increasing pace—especially for special purpose computers that serve a dedicated function. As an example, digital hearing aids have been miniaturized to such an extent that they can fit almost undetected in the ear.

Built around special purpose computer, digital hearing aid devices take analog sound presented to the ear, convert the sound to digital format, perform major signal process of the digitized sound, and then enhance the signal which is converted back to an analog signal and played to the user. A typical problem in older men is that they have progressively more hearing loss in higher than lower sound frequencies. Often older women have the reverse problem with progressively more hearing loss in lower rather than higher frequencies. Digital hearing aids can selectively enhance different ranges of frequencies, allowing hearing impaired users to hear normally.

Other digital hearing aids address the 'cocktail party' problem. A person without hearing impairment is able to 'mute' out the surrounding sound at a cocktail party, and just focus on conversation with a person directly in front of them. The hearing impaired progressively loses this ear/mind ability. But the cues and process by which this muting is done is in part understood, and digital hearing aids can digitally replicate this process and process sound to simulate the way a normal person 'mutes' out surrounding sound.

Global Positioning chips provide another example of a special purpose miniaturized, low-power dedicated computer-on-a-chip that perform complex functions. The constellation of Global Positioning Satellites (GPS) that make up the system, broadcast signals that allow GPS receivers to identify their position on the earth surface to within a few meters of accuracy. GPS chips are the real-time processor for terrestrial appliances (such as cell phones) to accurately identify geographic position, and can lock-onto the spread-spectrum signal of multiple satellites, perform analog-to-digital (A/D) conversion of the signals, extract several different formats of signals, and perform complex trigonometric calculations to triangulate and determine the base-stations geographic position on the earth.

Special purpose and dedicated computer miniaturization provides a level of technology in which miniaturized computers weight little, are rugged, powerful, small, perform extremely complicated mathematical and processing functions in real-time, and run on small and light-weight batteries for several weeks at a time. Such a special purpose computer could be utilized in the preferred embodiment of the invention.

Motion Picture Sound Formats

Motion pictures have both video and audio components that are sensed by viewers using their eyes and ears. Sensory perception through eyes is via light (electromagnetic radiation), while sensory perception through the ears is via sound (vibrational energy). Sound motion pictures must therefore record and play both light and sound to the viewer, with sound fully synchronized to the motion on the screen.

Many different means have been developed over the years to synchronize and record sound a motion picture. They include sound-on-film and sound-on-disc, optical and magnetic encoding of the sound, single- and multi-track sound channels, and monaural and stereophonic systems. Embodiments of the Pulfrich Filter Spectacles can either use these means directly, or use similar approaches to broadcast the Pulfrich Filter Spectacles synchronization signals.

Sound-on-film records the motion picture soundtrack directly on the film in an opaque area adjacent to the film. The encoding may be as either an optical or magnetic soundtrack. With optical, as the film is played, a beam of light from an exciter lamp or LED in the projector's soundhead shines through. Variations in the width of the soundtrack cause a varying amount of light to fall on a solar cell, which converts the light to a similarly varying electrical signal. That signal is amplified and converted to sound. With magnetic soundtracks a magnetic strip is used carry the soundtrack on film prints using narrow strips of iron oxide material similar to those on a tape recorder. A magnetic head in the projector's soundhead reads the soundtrack signal which is amplified and converted to sound. Sound-on-disc records the soundtrack on a media separate from the film. Early formats used cylinder and records; more recent versions use laserdisc or CD-ROM. Sound-on-disc requires a means to synchronize the sound to the motion picture, which is now commonly done using an optical timecode track recorded on the film. Soundtracks are also recorded as a single track (monaural) or using multiple channels for stereophonic sound and with separate channels to control special effects.

Motion pictures are moving rapidly into the digital and computer era. Formats to encode motion pictures are being rapidly developed for display on TVs and computer monitors. Also, digital cinema projectors that can read digitally encoded movies for projection in moving theaters are coming into increasing use.

Digital formats for encoding motion pictures are referred to as codecs—short for compressor/decompressor. A codec is any technology for compressing and decompressing data. Codecs can be implemented in software, hardware, or a combination of both.

Apparatus and formats for incorporating sound into motion pictures, and to achieve special effects have continually evolved since motion pictures were first developed. The Pulfrich Filter Spectacles can use any of these approaches, or in a similar fashion to those of the industry standards, include Pulfrich Filter Spectacles synchronization signals into the movies.

These technologies will be utilized in the preferred embodiment of the Pulfrich Filter Spectacles. Ultrasonic sound to signal synchronization events will be mixed in with the soundtrack of the movie. The sound will be picked up by the Pulfrich Filter Spectacles using a transducer that feeds the sound to a highpass filter to eliminate all audible sound so only the synchronization signals need to be process. The filtered signal is then converted to digital format using an analog-to-digital component, and a special purpose computer running digital signal processing and a synchronization event decision module issue electronic signals to control the clear or darkened state of the left and right lenses of the Pulfrich Filter Spectacles.

DETAILED DESCRIPTION OF THE FIGURES

Preferred Embodiment

FIG. 1

FIG. 1 is a block diagram 100 illustrating a preferred embodiment of the Pulfrich Filter Spectacles invention for connection-free Pulfrich glasses In the preferred embodiment, the viewing glasses 110 consist of a right lens 101, a left lens 102, and a Glass Lens Controller Unit (GLCU) 103. The GLCU 103 includes an audio receiver or transducer to receive the audio track of the movie; an highpass audio filter to eliminate audio frequencies below a threshold value of 45K Hz; an analog-to-digital converter to convert the filtered signal to a digital signal, and a special purpose processor running digital signal processing algorithms to process the filtered audio signal, identify the synchronization events embedded in the audio, and send signals to independently control the darkness of the right and left lenses based on the detected synchronization events.

For exemplary purposes, FIG. 1 shows the Pulfrich Filter Spectacles in one of the three states that the lenses can take. FIG. 1 shows the right lens 101 darkened and the left lens 102 as clear. This is the configuration to view a motion picture with a 3-dimensional effect in which the lateral motion is moving from left-to-right on the viewing screen.

In the preferred embodiment the viewing glasses may contain the GLCU 103 as an integrated part of the lenses. Other embodiments of the invention may have Pulfrich Filter Spectacles viewing glasses that fit over regular prescription glasses in a manner similar to that in which snap-on or clip-on sunglasses are configured.

FIG. 2

Figure 2:
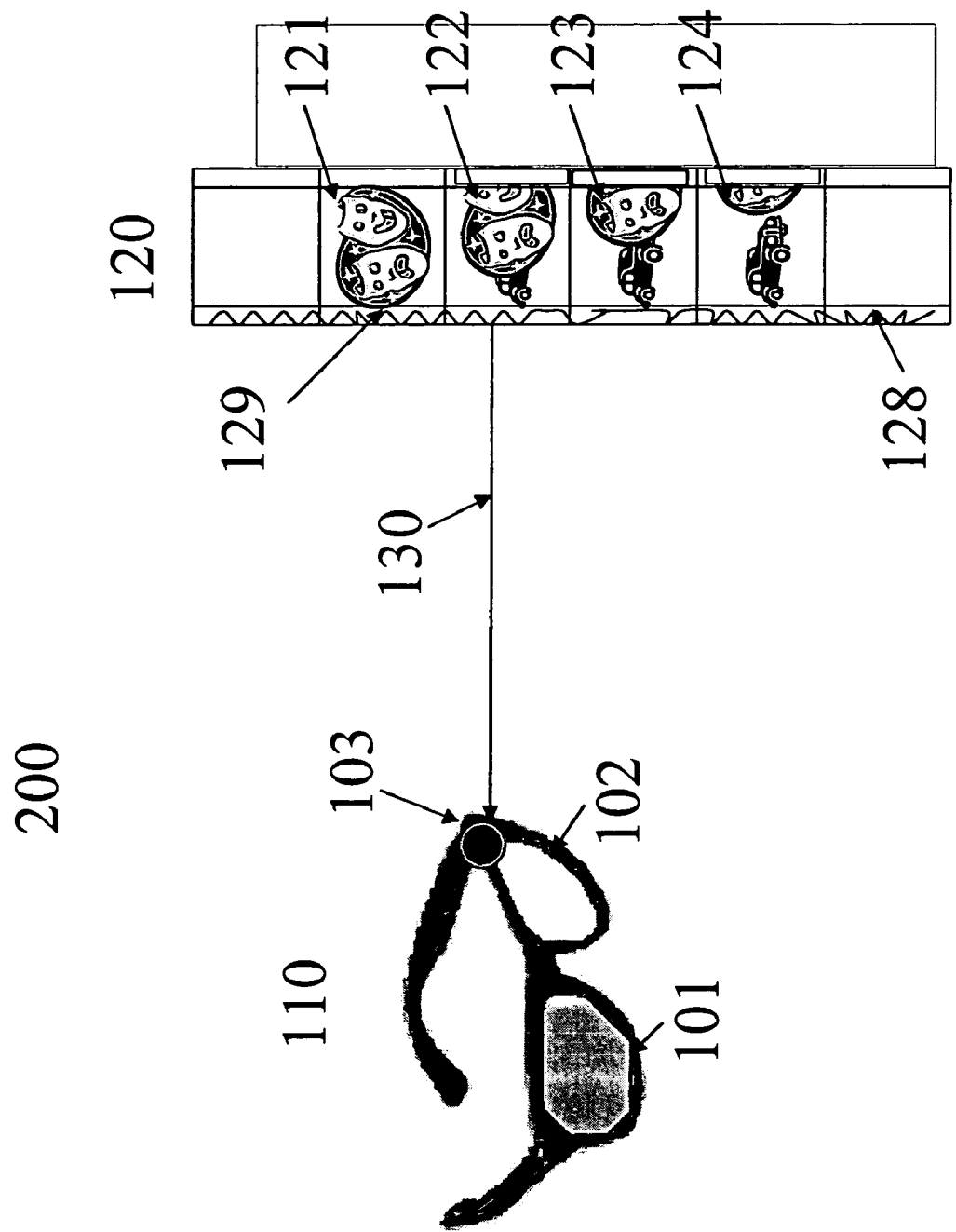
FIG. 2 is a block diagram illustrating use of the Pulfrich Filter Spectacles to view an ordinary motion picture with a 3-dimensional effect.

FIG. 2 is a block diagram 200 illustrating use of the Pulfrich Filter Spectacles to view 130 a motion picture with a 3-dimensional effect.

In the preferred embodiment the motion picture 120 is a regular motion picture consisting of consecutive frames 121 or pictures that make up the video portion of the motion picture, and the motion picture audio soundtrack 128 that also includes (mixed into the soundtrack of the motion picture) sound above human hearing that contain synchronization events timed to lateral motion in the motion picture. As the motion picture 120 is played for the viewer, they view 130 the motion picture through the Pulfrich Filter Spectacles 110, hears the audio 128, and the GLCU 103 is continually receiving and processing the audio signal 128, and controlling the state of the Pulfrich Filter Spectacles.

Note that just as the audio and the video of the motion picture can be viewed by one or more viewers, the synchronization signal can be received by one or more viewers wearing Pulfrich Filter Spectacles, so many viewers can simultaneously view the 3D effect, as in large viewing venues.

Four consecutive frames of a similar scene 121-124 are displayed with lateral motion moving across the motion picture from the left to the right direction. The foreground figure is passing in front of a figure of a vehicle in the background. The left lens 102 is shown in a clear state, and the right lens 101 is shown in a dark state, which is the Pulfrich Filter Spectacles 110 configuration to view the displayed left-to-right lateral motion with the Pulfrich 3-D visual effect.

Synchronization events are indicated by high-pitched (high-frequency) one-half second ultrasonic sound (beep) beyond human hearing. The preferred embodiment uses three synchronization states embedded in the audio track of the motion picture; 50K Hz to signal that the left 102 and right 101 lenses should both be set to clear; 60K Hz to signal that the left lens 102 should be set to clear and the right lens 101 to dark, and; 70K Hz to signal that the left lens 102 should be set to dark and the right lens 101 to clear.

In the example of FIG. 2, a synchronization event 129 takes place in motion picture frame 121. The synchronization event is a one-half second ultrasonic sound (beep) above human hearing of 60K Hz When this happens the motion picture soundtrack (including inaudible sync beep) is received on the transducer of the GLCU 103 unit which filters the signal to eliminate audio frequencies below the threshold value of 45K Hz, converts the filtered signal to a digital format using an analog-to-digital converter, and then passes the signal to a processor to perform digital signal processing on the filtered audio signal to identify the embedded audio synchronization events, and send signals to independently control the darkness of the right and left lenses based on the detected synchronization events. In this case the 60K Hz signal 129 causes the Pulfrich Filter Spectacles 110 to synchronize the lenses with the action in the motion picture by setting the left lens 102 to clear and the right lens 101 to dark.

The motion picture media is shown pictorially as regular film, though the preferred embodiment works equally well if the media is any form for digital motion pictures.

In another embodiment, Digital Cinema is the format for the motion picture. Digital Cinema is the next generation of motion pictures. Not only, is the production, editing, and storage of motion pictures increasingly done digitally, but even projection of motion pictures in theaters is becoming digital. Digital Cinema Projectors are comprehensive digital cinema appliances that combine high-quality and high-performance audio/visual motion picture projection with digital video and audio processing and computer networking capability. Digital Cinema Projectors are replacing film projectors in commercial movie theaters and can project movies, for instance, from a DVD onto a large screen for viewing by the entire theater audience. Since Digital Cinema Projectors include powerful computers with networking capabilities, the transmitter for the Pulfrich Filter Spectacles synchronization signals can be located in modules of the Digital Cinema Projectors—i.e. they can be used to not only to project synchronized audio and video, but also synchronize other events, such as Pulfrich Filter Spectacles synchronization signals.

In this Digital Cinema embodiment, a method, apparatus, and system similar to FIG. 2 illustrates how Pulfrich Filter Spectacles would be used in a theater that uses a Digital Cinema Projector to project the motion picture to the audience. The motion picture film 120 would be replaced by a digital format for the movie—which is still resolved by the Digital Cinema Projector to separate picture frames 121-124 for projection to the audience. As the motion picture is played for the viewer, they view 130 the motion picture through the Pulfrich Filter Spectacles 110, hears the audio 128, and the GLCU 103 is continually receiving and processing the audio signal 128, and controlling the state of the Pulfrich Filter Spectacles. While the synchronization signals can still be played through ultrasonic sound on the audio track, or any of the other alternative embodiment means, it may be preferable for the Digital Cinema Projector to directly manage the synchronization of the motion picture with the Pulfrich Filter Spectacles. In this case, signals within the digital motion picture or programming contained with the digital motion picture would be processed by the computer of the Digital Cinema Projector, and a module connected or part of the Digital Cinema Projector would broadcast the synchronization signal.

Other embodiments may use similar means by which the Digital Cinema Projector can synchronize other apparatus that enhance the viewing of the motion picture to the motion picture.

The invention works equally well with any of the formats of regular film. In other embodiments other threshold levels for the audio synchronization signals are used. Also different amplitudes may be used for each of the three controlling synchronization signals to better distinguish the synchronization signals. In still other embodiments different signaling can be utilized to control the Pulfrich Filter Spectacles. This may include the use of electromagnetic radiation, radio frequency, light or other means to transmit the synchronization events to the Pulfrich Filter Spectacles.

FIG. 3

FIG. 3 is a block diagram 300 showing the 3 lens states used by the Pulfrich Filter Spectacles.

FIG. 3a shows the lens states with the both the right and left lenses clear. Neither lens is darkened. This is the lens state that is used in the preferred embodiment when there is no significant lateral motion in the motion picture, and is triggered by a 50K Hz audio signal.

FIG. 3b shows the lens states with the left lens clear and the right lens darkened. This is the lens state that is used in the preferred embodiment when foreground lateral motion in the motion picture is moving from the left to the right direction, as seen from the viewer's perspective, and is triggered by a 60K Hz audio signal.

FIG. 3c shows the lens states with the left lens darkened and the right lens clear. This is the lens state that is used in the preferred embodiment when the foreground lateral motion in the motion picture is moving from the right to the left direction, as seen from the viewer's perspective, and is triggered by a 70K Hz audio signal.

In the preferred embodiment of the invention the lens state consisting of both left and the right lens darkened, is not used. This lens state can be achieved by the Pulfrich Filter Spectacles, and may have uses in other embodiments of the invention.

In other embodiments of the invention, the right and left lenses of the viewing glasses may take a multiplicity of different levels of darkness to achieve different effects, resulting in more lens states that shown for demonstration purposes in the preferred embodiment. In particular, the darkening of the non-clear lens can be optimized according to the speed of lateral motion, so as to maximize the degree of 3-dimensional effect. In these embodiment, other threshold levels of sound (frequency and amplitude) above human hearing would be used to signal the synchronization state.

FIG. 4

Figure 4:
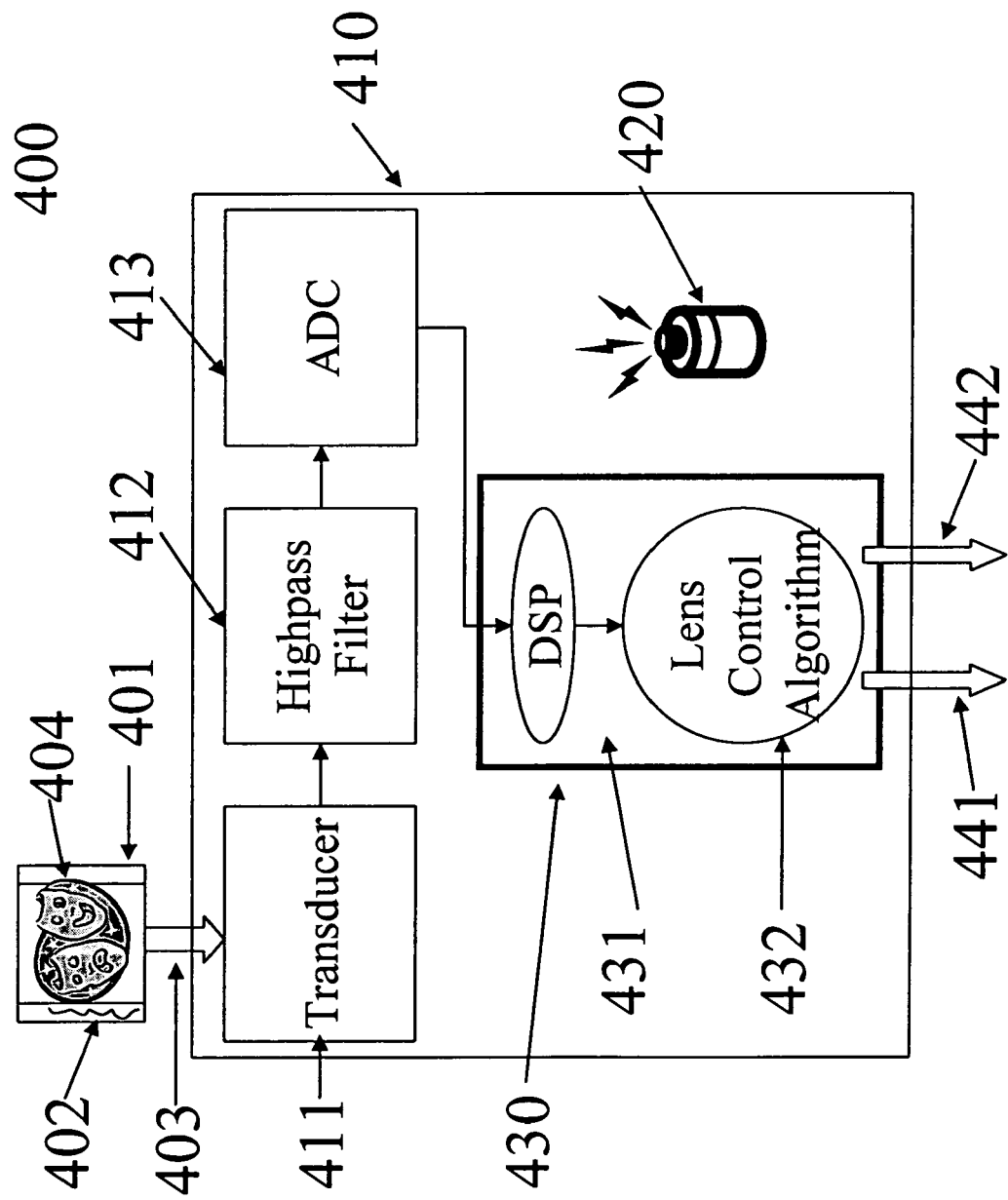
FIG. 4 is a block diagram of the Glass Lens Controller Unit, or GLCU 103.

FIG. 4 is a block diagram 400 of the Glass Lens Controller Unit 103 (GLCU). First, a single frame of video 401, consisting of a motion picture media frame 404, and the motion picture audio soundtrack 402 travels 403 to the Pulfrich Filter Spectacles 110. The video is viewed by the viewer of the movie through the Pulfrich Viewer Spectacles 110. The audio soundtrack 402 is picked up by the transducer 411.

The audio soundtrack signal is then passed through a highpass filter 412 to eliminate the audible sound and only leave synchronization information in the signal. In other embodiments an ultrasonic transducer may be utilized in the place of the transducer 411, which could eliminate the need for the highpass filter 412.

The filtered synchronization signal is then passed to the analog-to-digital component 413 to convert the synchronization signals from analog to digital format. The digital information is passed to the computer processor 430 to process the signal resulting in electronic signals that control the state of the Pulfrich Filter Spectacle lenses. Note that all components of the Pulfrich Filter Spectacles are powered by a battery 420.

On the computer processor is running a digital signal processing (DSP) algorithm 431, that takes as input the signal and determines the presence/absence of synchronization control signals. When a signal of one-half second duration is found above the 45 KHz frequency, it is processed by the lens control algorithm 432 to determine which of the three synchronization control signals it is.

The lens control algorithm 432 can determine synchronization events and control the state of the left 102 and right 101 lenses of the Pulfrich Filter Spectacles 110.

The proper state of the lens, dark or clear, is controlled by an electronic signal 441 that controls the state of the left lens, and another electronic signal 442 to control the state of the right lens. In the preferred embodiment the lens state is clear when there is an absence of electrical current, and darkened when current above a threshold value is present.

When the lens control algorithm 430 identifies a synchronization event associated with no lateral motion in the motion picture, then the GLCU 103 sets the left and right lenses to clear-clear by causing no current to pass over the viewing glass left control circuit 441, and no current over the viewing glass right control circuit 442. If the lens control algorithm 430 identifies a synchronization event associated with lateral motion in the motion picture moving from the left to the right of the motion picture, then the GLCU 103 sets the left and right lenses to clear-dark by causing no current to pass over the viewing glass left control circuit 441, and current in excess of a threshold level to pass over the viewing glass right control circuit 442. If the lens control algorithm 430 identifies a synchronization event associated with foreground lateral motion in the motion picture moving from the right to the left of the motion picture, then the GLCU 103 sets the left and right lenses to dark-clear by causing no current to pass over the viewing glass right control circuit 442, and current in excess of a threshold level to pass over the viewing glass left control circuit 441.

FIG. 5

Figure 5:
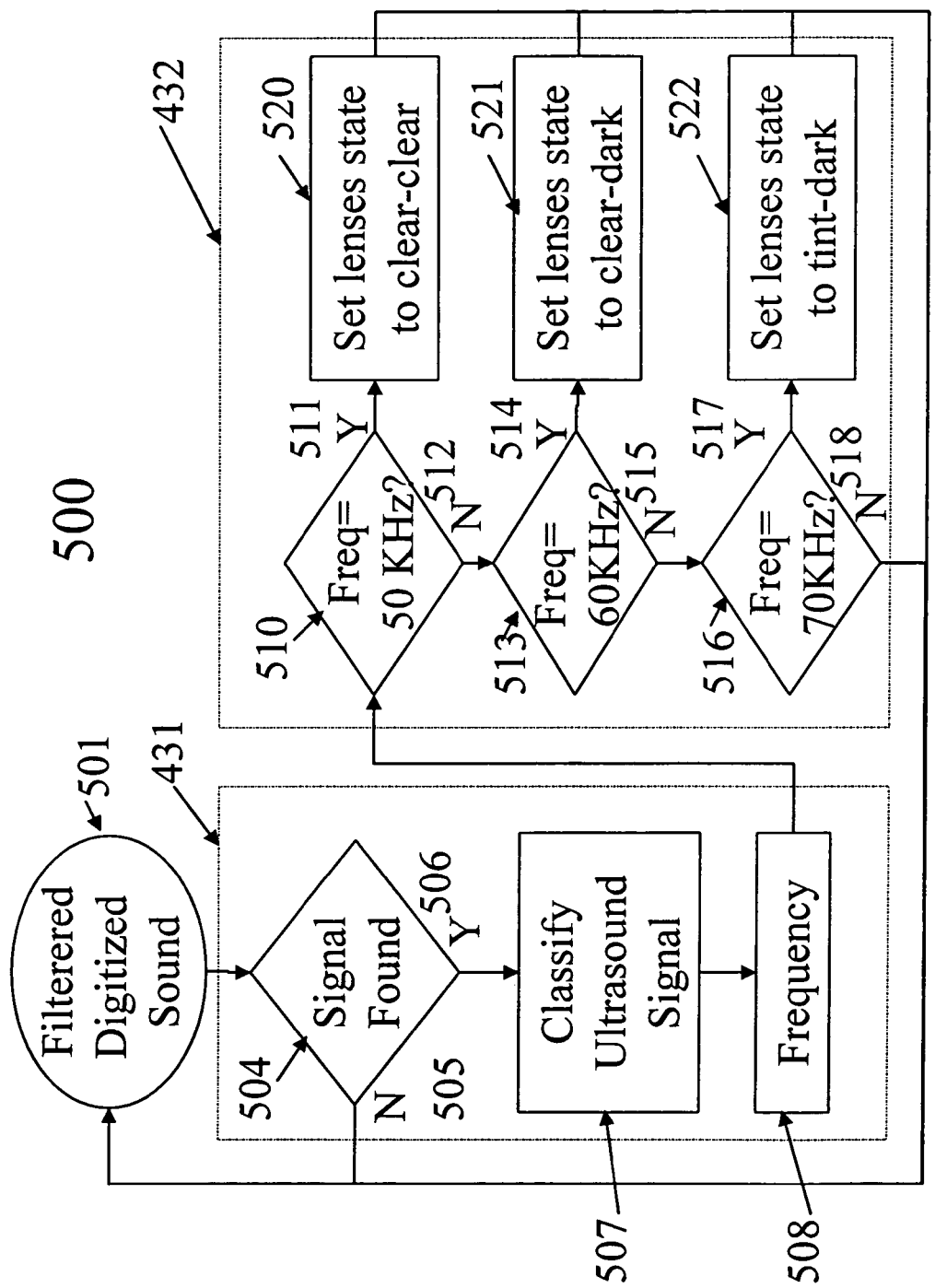
FIG. 5 is a flowchart for the digital processing of the synchronization signals.

FIG. 5 is a flowchart for the digital processing of the synchronization signals. It provides a flowchart 500 for the operation of the DSP 431 and lens control algorithm 432 executing on the computer 430. It shows a flowchart 500 for the identification and classification of the synchronization signal by the DSP 431, and the lens control algorithm 432 that controls the right 101 and left 102 lenses of the Pulfrich Filter Spectacles 110.

The algorithm begins with the DSP 431 accessing the filtered digitized sound 501, and testing for the presence of a control synchronization signal 504. If a signal is not found 505 then the signal continues to be monitored and tested for the presence of a control synchronization signal. If a signal above 45 KHz is found 506, then the ultrasound is classified 507, and the type of synchronization signal is stored in the digital holder 'Frequency' 508.

A 'Frequency' value 508 of 50 KHz indicates that there is no lateral motion and the left 102 and right 101 lenses of the Pulfrich Filter Spectacles 110 should be set to clear-clear respectively 301. A 'Frequency' value 508 of 60 KHz indicates that there is lateral motion from the left to the right of the screen, and the left 102 and right 101 lenses of the Pulfrich Filter Spectacles 110 should be set to clear-dark respectively 302. A 'Frequency' value 508 of 70 KHz indicates that there is lateral motion from the right to the left of the screen, and the left 102 and right 101 lenses of the Pulfrich Filter Spectacles 110 should be set to dark-clear respectively 303.

Processing continues then in the lens control algorithm 432.

The stored value 'Frequency' 508 is compared 510 to see if it has a value of '50 KHz' indicating no lateral motion in the motion picture. If the value is '50 KHz' 511 then the left 102 and right 101 lenses of the Pulfrich Filter Spectacles 110 are set 520 to clear-clear respectively 301. If the stored value of 'Frequency' 508 is not '50 KHz' 512 then processing continues by comparing 513 the stored value 'Frequency' 508 to '60 KHz' indicating lateral screen movement from the left to the right of the screen. If the value is '60 KHz' 514 then the left 102 and right 101 lenses of the Pulfrich Filter Spectacles 110 are set 521 to clear-dark respectively 302. If the stored value of 'Frequency' 508 is not '60 KHz' 515 then processing continues by comparing 516 the stored value 'Frequency' 508 to '70 KHz' indicating lateral screen movement from the right to the left of the screen. If the value is '70 KHz' 517 then the left 102 and right 101 lenses of the Pulfrich Filter Spectacles 110 are set 522 to dark-clear respectively 303. If the stored value 'Frequency' 508 is not '70 KHz' 518 then processing continues by checking the filtered digitized sound 501 for a signal 504 with the DSP unit 431.

In other embodiments, if a signal above 45 KHz is identified, but the type of synchronization signal cannot be identified, then the lens control algorithm would automatically set the state of the lenses to a default state of clear-clear before continuing processing of the incoming filtered digitized sound.

In other embodiments of the invention, the processor may have a multiplicity of different lens control algorithms which may be selected either by the viewer, or selected under computer control. For instance, different lens control algorithms may utilize different default states that control the duration for how long any lens state may remain active before returning to the clear-clear state.

FIG. 6

FIG. 6 is the decision procedure 600 used by the lens control algorithm to control the state of viewer glasses. The decision procedure is used for control of the Pulfrich Filter Spectacles, and demonstrates how the right and left lenses of the viewer glasses are controlled based on the identification of synchronization events.

Throughout the viewing of the motion picture the decision rule 700 is reevaluated based on processing of the audio of the soundtrack of the movie as received, filtered, digitized and processed by the Pulfrich Filter Spectacles. At each decision point in the processing, the decision rule first determines if a synchronization event has been identified—i.e. that an ultrasonic beep above the threshold of 45 KHz is present, and if so places the lenses of the viewer glasses into the appropriate state to view the motion picture with a 3-dimensional effect.

If a synchronization event has been identified, then the decision rule determines the type of synchronization event. The three types of synchronization events in the preferred embodiment are to synchronize the viewer glasses for no lateral motion on the screen, left-to-right lateral motion on the screen, or to synchronize the viewer glasses for right-to-left lateral motion on the screen.

If the synchronization event is for no lateral motion on the screen then the decision rule will cause the Pulfrich Filter Spectacles to take the state where both the right and left lenses are clear. If the synchronization event if for left-to-right lateral motion on the screen then the decision rule will cause the Pulfrich Filter Spectacles to take the state where the left lens is clear and the right lens is partially occluded or darkened. If the synchronization event is for right-to-left lateral motion on the screen then the decision rule will cause the Pulfrich Filter Spectacles to take the state where the right lens is clear and the left lens is partially occluded or darkened.

In the preferred embodiment, there are only 3 synchronization events. Other embodiments may have more than 3 synchronization events, and would use similar though more complicated synchronization decision rules to control the lenses of the viewer glasses.

Other embodiment may have synchronization algorithms that utilize various heuristic rules in determining a synchronization event. For instance, if the viewer lenses responding to rapidly detected changing lateral motion, switch states too rapidly, this may cause undue discomfort to the viewer. Other embodiments may allow the user to override the synchronization signals placed in the motion picture, and require that any single state remain active for a minimum period of time. This may be important for people that are photosensitive—people who are sensitive to flickering or intermittent light stimulation. Photosensitivity is estimated to affect one in four thousand people, and can be triggered by the flicker from a television set. While photosensitive people may simply remove the Pulfrich Filter Spectacles, heuristic rules could be employed to reduce flicker and eliminate any additional photosensitivity from the Pulfrich Filter Spectacles. For instance, such a heuristic rules may implement logic in the synchronization decision rule that require that no change to a synchronization event can take place for a set number of seconds after the last synchronization event—i.e. a lens state must be active for a minimum length of time before a new state may be implemented.

In other embodiments, detection of a synchronization event would change the state of the lenses for a specific length of time. For instance, the synchronization event may change the right and left lenses to a corresponding darkened-clear state for 10 seconds and then change back to a default state of clear-clear. Even if another synchronization event were to be detected in that 10 second interval, those subsequent synchronization events would be ignored. This would prevent too rapid changes to the state of the lenses that might be uncomfortable for the viewer.

FIG. 7

FIG. 7 700 shows various alternative means by which the Pulfrich Filter Spectacles 110 synchronization signals would be incorporated in motion picture sound standards that are currently used by the motion picture industry.

FIG. 7a 710 shows how synchronization signals 130 for the Pulfrich Filter Spectacles 110 could be included in preferred embodiment of the invention that uses a single monaural sound channel of sound-on-film in an optical format. Ultrasonic sounds are mixed in with the soundtrack of the motion picture. For playback in the movie theater, at least one ultrasonic speaker would be employed to play the ultrasonic Pulfrich Filter Spectacles synchronization signals.

FIG. 7b 720 shows how synchronization signals 130 for the Pulfrich Filter Spectacles 110 could be included in the Sony Dynamic Digital Sound (SDDS) digital sound film format. SDDS places 6 or 8 tracks of digital sound on 2 optical stripes on each edge of the film strip, recorded on the cyan layer beneath the other emulsion layers. It uses the lossy ATRAC algorithm of the Sony Minidisc technology with a compression ratio of 5:1, dynamic range of 105 db and a frequency response from 5-20,000 Hz. In other embodiments of the invention, one of the digital optical tracks can be used to generate a Radio Frequency or network signal to control suitably equipped Pulfrich Filter Spectacles.

FIG. 7c 730 shows how synchronization signals 130 for the Pulfrich Filter Spectacles 110 could be included in the Dolby Stereo Digital (SR-D) format. SR-D 35 mm prints provide both digital and analog optical soundtracks using multi-channel digital audio coding. The SR-D digital sound film format uses 6 digital optical tracks, recorded between sprocket holes, to the 4 existing Dolby SR analog optical tracks on the edges of the film strip. In another embodiment of the invention, one of the 6 digital optical tracks, or one of the 4 analog optical tracks are used to carry the Pulfrich Filter Spectacles synchronization signals. The sync signals are played through ultrasonic speakers as ultrasonic sound as described in the preferred embodiment. Alternatively, the digital optical tracks can be used to generate a Radio Frequency or network signal to suitably equipped Pulfrich Filter Spectacles.

In other embodiments, and in an analogous fashion, Pulfrich Filter Spectacles synchronization signals can be included on sound-on-disc soundtrack formats. For instance, Digital Theater Systems (DTS) digital sound film format records 6 tracks on separate CD-ROM disks, synchronized by an optical timecode track recorded on the film, co-existing with a backup optical soundtrack similar to Dolby Stereo. One such embodiment includes the audible or inaudible synchronization signals on the soundtrack recorded on a channel of the disk carrying the soundtrack. Other embodiments may utilize digital signals on the film similar to the optical timecode track, or utilize a backup optical soundtrack channel.

In other embodiments of the invention, the Pulfrich Filter Spectacles synchronization signals are mixed in with the audio portion of an existing codec or digital formats for encoding motion pictures. In still other embodiments, a special Pulfrich Filter Spectacles codec may be developed that would contain the audio, video, and Pulfrich Filter Spectacles synchronization signals.

Different embodiments of the Pulfrich Filter Spectacles may utilize any of these means to encode the Pulfrich Filter Spectacles synchronization signals. This may include any of the systems for sound-on-film or sound-on-disc, optical or magnetic encoding of the sound, single- or multi-track sound channels, monaural or stereophonic systems, or film of digital media. For instance, while the preferred embodiment uses ultrasonic sound mixed in with the soundtrack of a motion picture, and presented as a single optical channel of sound-on-file, other embodiments may use digital encoding of the synchronization signals on separate channels of a multi-track sound-on-film. Still other digital embodiments may develop special Pulfrich Filter Spectacle Codecs for synchronization of the motion picture and Pulfrich Filter Spectacles.

OTHER EMBODIMENTS

The preferred embodiment is an implementation of the invention that achieves great benefit to the viewer of a motion picture by using timed signals to move a Pulfrich filter before one eye or the other as appropriately synchronized to the current direction of screen foreground movement. It described filtering spectacles with no moving parts and no wire connections and use material that partially occludes or entirely clears the lenses of the Pulfrich filter in response to the electronic signal.

Synchronization

In other embodiments of the invention, the signaling system that controls the Pulfrich filters and switches the filter to the appropriate eye, could be printed or attached to the edge of a file, or placed on a soundtrack as an inaudible signal.

Other embodiments of the invention may benefit from several levels of occlusion (other than just clear and one level of darkness) of the lenses of the viewer glasses. In general the slower the foreground lateral motion, the more darkening (delay of the image reaching one eye) is necessary to produce a Pulfrich video effect. Other embodiments may use many different lens states to enhance the special effects produced by the Pulfrich Filter Spectacles.

In still other embodiments, we utilize a steganographic technique to hide the synchronization and control information within the soundtrack of a motion picture. Steganography is a cryptographic technique which seeks to hide the existence of information (usually with watermarking) within the digital media. It is the art and science of hiding information by embedding messages within other, seemingly harmless messages. Steganography works by replacing bits of useless or unused data in regular computer files such as graphics, sound, text, HTML, with bits of different, invisible information.

Steganographic techniques have been utilized in music recording as a means to protect copyrights. Also referred to as simply watermarking, a pattern of bits inserted into a digital image, audio or video file that identifies the file's copyright information (author, rights, etc.). The name comes from the faintly visible watermarks imprinted on stationery that identify the manufacturer of the stationery. The purpose of digital watermarks is to provide copyright protection for intellectual property that's in digital format.

Unlike printed watermarks, which are intended to be somewhat visible, digital watermarks are designed to be completely invisible, or in the case of audio clips, inaudible. Moreover, the actual bits representing the watermark must be scattered throughout the file in such a way that they cannot be identified and manipulated. And finally, the digital watermark must be robust enough so that it can withstand normal changes to the file, such as reductions from lossy compression algorithms. There are many different companies offering competing technologies. All of them work by making the watermark appear as noise—that is, random data that exists in most digital files anyway. To view a watermark, you need a special program that knows how to extract the watermark data.

In other embodiments of the invention, rather than add ultrasonic sound to the soundtrack to indicate the Pulfrich Filter Spectacles synchronization events, the invention would utilize other steganographic and watermarking techniques to hide inaudible synchronization events in or accompanying the soundtrack of the movie.

Inaudible sounds that are too low-pitched to be consciously perceived by humans are called infrasound. In still other embodiments, rather than use ultrasonic sounds to indicate Pulfrich Filter Spectacles synchronization events, the invention may use signals from the infrasound frequencies.

In still other embodiments, timing formulas for synchronizing a specific movie with Pulfrich Filter Spectacles may be made available to viewers in other ways besides ultrasonic signals embedded in a motion picture's soundtrack. DVD players may be manufactured to incorporate Pulfrich Filter Spectacles signaling devices and/or this invention may itself incorporate an electronic reader/player that can send signals to the spectacles from a memory card or other data-holder formulated to match the action-events in the course of a specific movie. Again, as television and the computer continue to converge, it would be possible to download Pulfrich Filter Spectacles coordinating data for specific movies from a website set up for that purpose.

In still another embodiment, the individual viewer may also be equipped with means so that by simply pressing either of two buttons—to mark passages in any movie, home-move or music video etc., as left or right darkening or clear for playback to signal and control the Pulfrich Filter Spectacles.

Equipment

Other embodiments of the invention may have more complex equipment, and more than three lens states, and more complex controller algorithms. These other embodiments would still operate on the same principle—glasses that have a sensor to pick up the synchronization signals, electronic component and computer processor to process the synchronization signals, and a control algorithm running on the computer processor that can identify synchronization events, and use that control information to control the state of the glass lenses.

The preferred embodiment of the invention uses LCD for the lens materials. Other embodiments of the Pulfrich Filter Spectacles may use other material that can be controlled to change state and partially occlude or entirely clears the lenses of the viewer glasses. Such materials include, but are not limited to suspended particle materials, and electrochromic materials—both of which allow varying levels of transparency dependent on the applied electric charge. Electrochromic materials darken when voltage is added and are transparent when voltage is taken away.

In other embodiments the viewing glasses may include power on/off switches, and/or switches to override the operation of the glasses—e.g. by causing them to stay in the clear state and ignore the detected synchronization information. In other embodiments the Pulfrich Filter Spectacles may have switches to override the detected synchronization information, and place the viewer glasses in a state for left-to-right lateral motion (clear-dark), or for right-to-left lateral motion (dark-clear).

In other embodiments there may be buttons on the spectacles to allow the user to override and control the operation of the spectacles. This includes, turning on and off the spectacles, controlling the shading of the lenses. For viewer glasses that can take a multiplicity of shades of darkness, this would allow the viewer to control to some extent the extent to which they view the 3-dimensional effect. In still other embodiments, the synchronization signaling for the Pulfrich Filter Spectacles may be by a hand remote controlling the spectacles.

In still another embodiment, rather than one clear and one darkened lens, the invention uses two darkened lenses of different intensities.

In another embodiment, the lens control algorithm of the Pulfrich Filter Spectacles can be disabled, and synchronization user-controlled. In still another embodiment the lens control algorithm is operational, but can be overridden by user controls.

In another embodiment the synchronization signals are used to control mechanical gears powered by a small motor that rotate a first set of movable polarized filters mounted in front of a second set of polarized filters that are fixed and unmovable in the Pulfrich Filter Spectacles. The second non-rotating polarized filters are fixed in the frames of the Pulfrich Filter Spectacles and have an identical polarized orientation. In response to synchronization signals, the first set of Polarized filters can rotate to take any of 3 different orientations. In the first orientation, the left and right polarized filters have the same orientation as the polarized filters fixed in the spectacle frame so the viewer has a clear view of the screen with both eyes. In the second orientation, the left polarized filter has the same orientation as the polarized filter fixed in the left lens of the spectacles, and the right polarized filter has an orientation that is at an angle of 45 degrees as the polarized filter fixed in the right lens of the spectacles, so the left eye has a clear view of the screen and the right eye a partly occluded view. In the third orientation, the right polarized filter has the same orientation as the polarized filter fixed in the right lens of the spectacles, and the left polarized filter has an orientation that is at an angle of 45 degrees to the polarized filter fixed in the left lens of the spectacles, so the right eye has a clear view of the screen and the left eye a partly occluded view.

Other embodiments may use modular digital multitrack (MDM) recorders that use videocassette transport with videocassette tape that can record up to eight channels with the ultrasonic sounds above human hearing recorded on one of the separate channels.

Visual Effects

In another embodiment of the invention, 3D Pulfrich illusions can be achieved for viewing traveling-camera shots. As the camera moves forwards so that screen movement moves both left and right outward from the screen center, each lens could half-darken split along their centers, to the left of the left lens, and to the right of the right lens. Similarly when viewing the scene where the camera retreated in space, and screen movement simultaneously appeared from both sides toward the center, center-halves of each spectacle would simultaneously darken.

In still other embodiments, other visual effects, such as secret coding and messages, could be implemented. In these embodiments of 'decoder glasses' special lens configurations, such as left-lens/right lens of Red/Red or any identical color may be used for decoding secret messages.

Another preferred embodiment would allow the viewing of actual 3-dimensional displays in order to exaggerate or produce uncanny depth effects. For instance a use might be for stage effects such as advertising displays or motion-based artworks for display in museums and galleries.

While preferred embodiments of the invention have been described and illustrated, it should be apparent that many modifications to the embodiments and implementations of the invention can be made without departing from the spirit or scope of the invention.

The invention claimed is:

1. A 3-D viewing system comprising:
   a pair of spectacles that cover both a right eye and left eye for viewing motion pictures comprising: a frame; a left lens and a right lens mounted in said frame, each of said lenses having transmission of light individually controlled for a clear state and a partially blocked state where transmission of light is partially reduced; and
   a control unit connected with said left lens and right lens individually controlling the transmission of light for the clear state and/or the partially blocked state of said right lens and left lens based on synchronization signals synchronized with a lateral motion of an image of an object in the motion picture;
   said control unit comprising a receiving means for receiving said synchronization signals, a transforming means for transforming said synchronization signals into electric currents, and a transmitting means for transmitting said electric currents to said right lens and/or left lens to reduce the transmission of light;
   whereby two-dimensional motion pictures having regular image sequence may be viewed with 3-D effects.

2. The spectacles in the system of claim 1, wherein said left lens and said right lens are manufactured from at least one of a liquid crystal, electrochromic, or smartglass material.

3. The system of claim 1, where said control unit controlling the transmission of light by generating electrical currents above or below a set threshold, above which the lens is partially blocked, and below which the lens is clear.

4. A method of producing synchronization signals for a 3-D viewing system with a control unit and a pair of spectacles having a left lens and a right lens, each of said lenses having transmission of light individually controlled by said control unit for a clear state and a partially blocked state where transmission of light is partially reduced, comprising the steps of:
   comparing frames in a sequence of said motion picture to recognize a lateral motion of an image of an object in said motion picture;
   identifying a direction of said lateral motion; configuring a synchronization event by following rules:
      when said lateral motion of said image of said objects on the screen is:
      from left to right, setting a synchronization signal to direct said left lens clear and said right lens partially blocked;
      from right to left, setting a synchronization signal to direct said right lens clear and said left lens partially blocked;
      non-existent, setting a synchronization signal to direct said left lens and said right lens both clear;
   generating a synchronization signal based on said synchronization event; and
   associating said synchronization signal with said frames of said motion picture.

5. The method of claim 4, where said synchronization event further comprises:
   when said lateral motion directs to both sides, setting a synchronization signal to direct said left lens and said right lens both in a clear or blocked state defaultly determined.

6. The method of claim 4, wherein said synchronization signal comprises at least one of ultrasonic sound, infrasonic sound, electro-magnet, electric current, radio frequency or light.

7. The method of claim 4, where said synchronization signal being generated as an ultrasonic sound-track mark, associated with said frames into a fully synchronized sound channel and transmitted as ultrasonic sound.

8. A method of displaying two-dimensional motion pictures having regular image sequence as 3-D motion pictures, comprising the steps of:

utilizing a 3D viewing system with a control unit responding to synchronization signals synchronized with a lateral motion of an image of an object in the motion picture, and a pair of spectacles having a left lens and a right lens, each of said lenses having transmission of light individually controlled by said control unit for a clear state and a partially blocked state where transmission of light is partially reduced;

acquiring said synchronization signals;

displaying said motion picture; and transmitting said synchronization signals along with the showing of said motion picture.

\* \* \* \* \*